Figure 1:
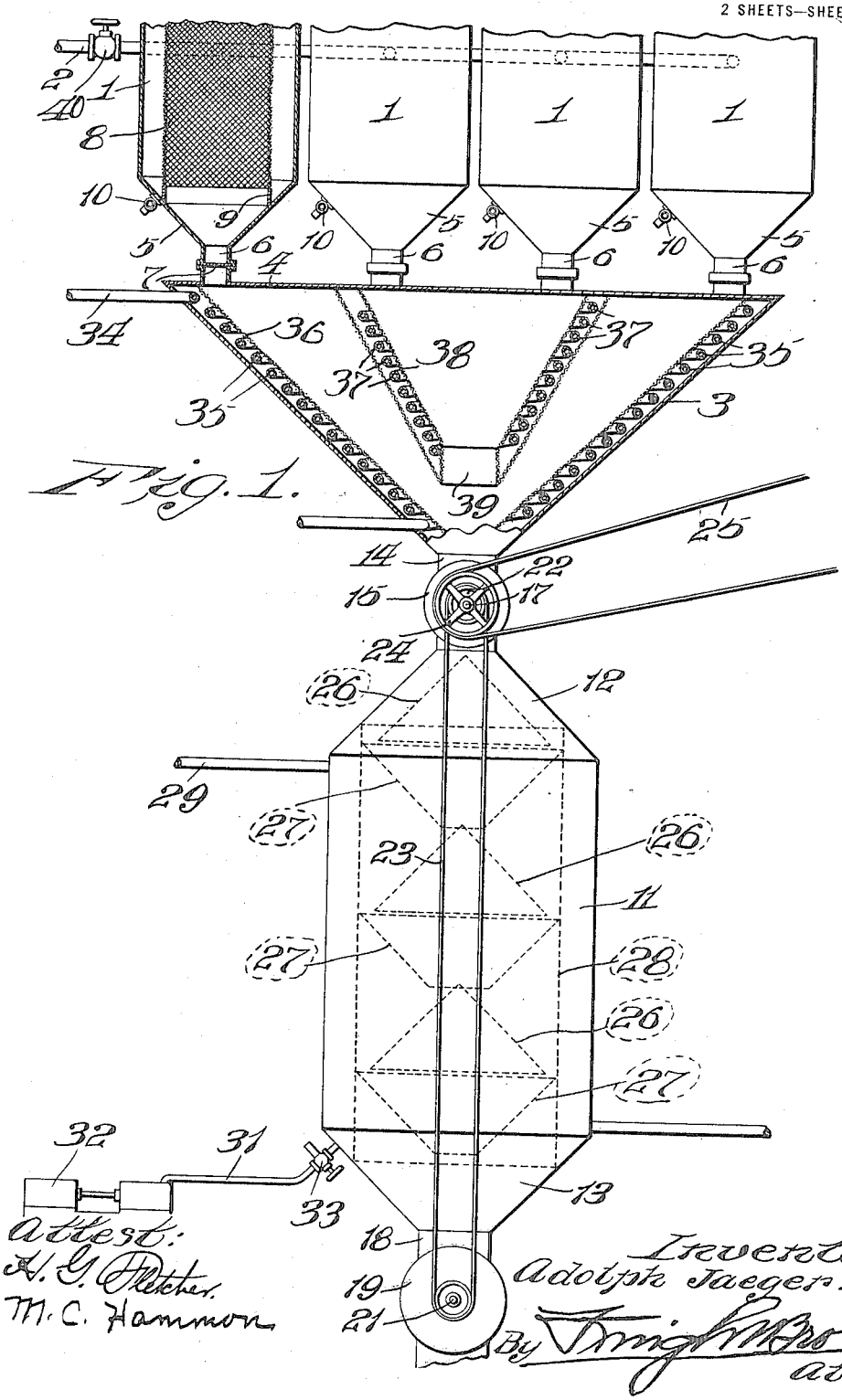

A. JAEGER.
APPARATUS FOR TREATING GRAINS.
APPLICATION FILED AUG. 18, 1911.

1,207,763.

Patented Dec. 12, 1916.
2 SHEETS—SHEET 1.

Attest:
A. G. Fletcher.
M. C. Hammon.

Inventor:
Adolph Jaeger.
By Wright Bros.
attys.

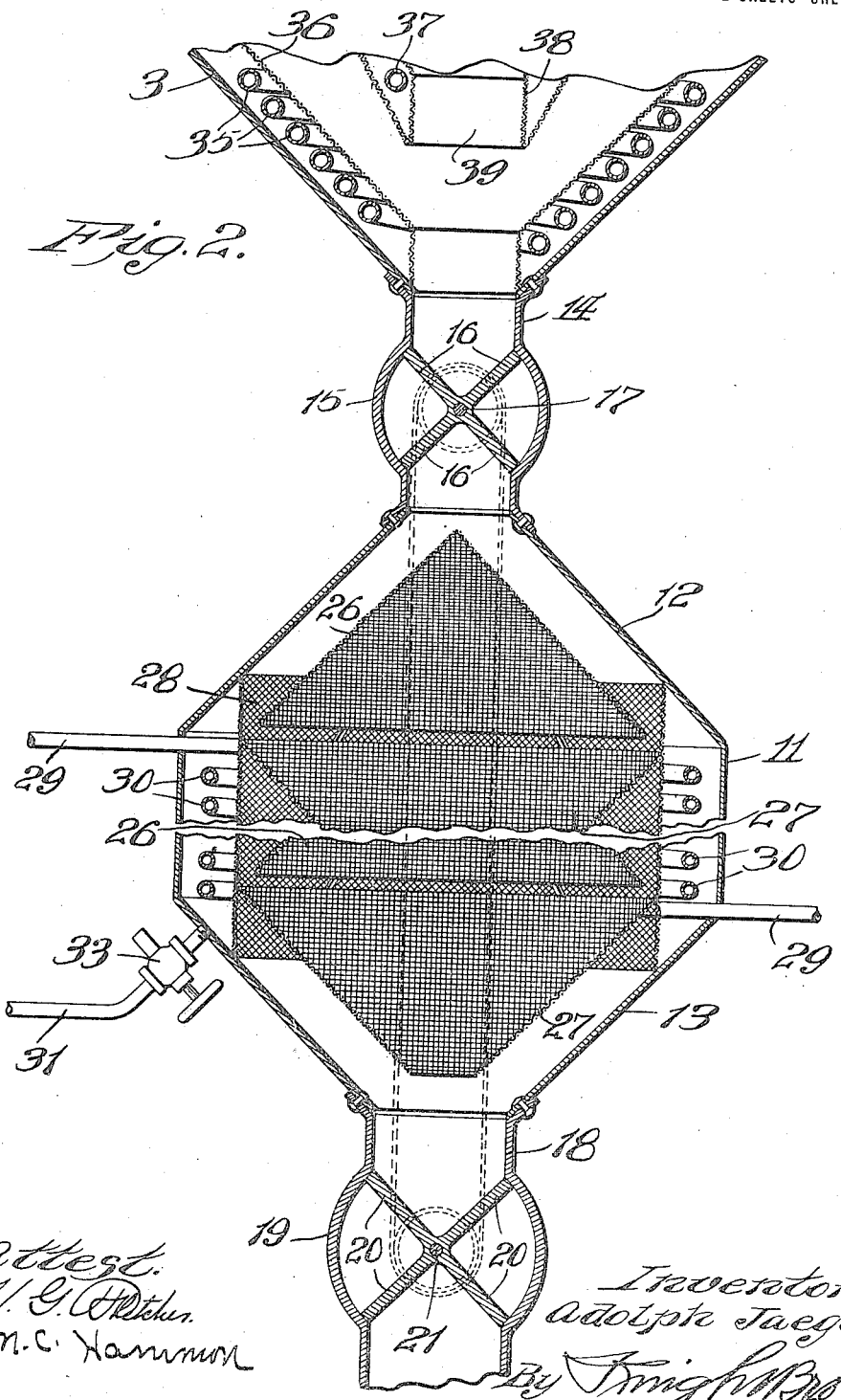

UNITED STATES PATENT OFFICE.

ADOLPH JAEGER, OF JACKSON, MISSOURI, ASSIGNOR OF FORTY-FIVE ONE-HUNDREDTHS TO ARTHUR O. KNIGHT, OF ST. LOUIS, MISSOURI.

APPARATUS FOR TREATING GRAINS.

1,207,763.                   Specification of Letters Patent.        Patented Dec. 12, 1916.

Application filed August 18, 1911. Serial No. 644,794.

*To all whom it may concern:*

Be it known that I, ADOLPH JAEGER, a citizen of the United States, residing at Jackson, in the county of Cape Girardeau and State of Missouri, have invented certain new and useful Improvements in Apparatus for Treating Grains, of which the following is a specification.

This invention relates to processes for preparing grains for milling and has for its primary object to provide an improved construction, combination, and arrangement of parts in an apparatus of this character, whereby said grains can be dry heated previously to being dehydrated *in vacuo*, or whereby said grains can be moistened or saturated before being dehyrated *in vacuo*.

The general purpose of this invention is to make it possible to secure beneficial results heretofore but imperfectly accomplished, contemplating the conditioning of grains to fit them to be stored for long periods of time without injury from spontaneous heating due to moisture or from becoming musty during long storage. By this apparatus, wheat or other grains which have become musty, can be fully renovated without the employment of blue vitriol or other injurious agents. Especially in connection with the treatment of wheat berries, the present invention provides ready and efficient means for expelling the pigment producing oils, said oils being forced out during the dehydration *in vacuo*. In extremely dry seasons the grain is preferably first moistened or soaked for softening and swelling it preliminarily to its treatment *in vacuo*, thereby making the pressure within the individual berries more effective in expelling the undesirable elements. For deodorizing onions and other odoriferous plants and seeds which commonly become intermixed with the grain in large quantities, the vacuum treatment is of great value, not only removing the odor entirely but also rendering the onions and the like easily broken up without any injury whatsoever to the grain berries. The apparatus is adapted to operate continuously, thereby enabling a greater output and more effective results in general. The apparatus shown and described also discloses means for heating the vapors thrown off *in vacuo* for expanding them.

Other and further objects will appear in the specification, and be specifically pointed out in the appended claims, reference being had to the accompanying drawings exemplifying the invention, and in which, Figure 1 is a side elevation of the apparatus constructed in accordance with the principles of the present invention, parts being broken away, and parts being shown in section. Fig. 2 is an enlarged detail vertical section through the dehydrating tank, parts being broken away, and parts being shown in elevation.

According to the herein described embodiment of this invention, means for effecting a preliminary softening of the grain in sufficient quantities to provide a continuous supply to the dehydrating apparatus are provided by a plurality of grain tanks or bins 1 into which steam may be introduced by means of a steam supply pipe 2. Said tanks are arranged in a group above a general hopper 3 into which they are adapted to discharge through apertures in the top sheet 4 of the hopper. For this purpose, each of the steam tanks is provided with a hopper bottom 5 which communicates with the hopper 3 through a neck 6, the passageway through said neck being controlled by a closure 7 which may be operated in any suitable manner to permit the desired flow of soaked grain into the hopper 3 for the purposes of the process.

Within each steam tank, and spaced therefrom, is an inner shell 8 of any suitable reticulated material, within which the grain is contained while it is being soaked. The inlets from the steam pipe 2 are arranged to discharge into the annular space between the outer shell 1 and the reticulated shell 8. An annular trough is provided in the bottom of each tank by a narrow strip 9 which extends around the lower end of the screen 8, said trough being adapted to collect the excess moisture from condensation. An outlet valve 10 is provided for drawing off this condensation.

The general hopper 3 is disposed above the dehydrating apparatus whose outer shell comprises a central cylindrical portion 11, a frusto-conical cap 12, and a hopper bottom 13. As shown in Fig. 2 of the drawings, a substantially air-tight closure of the dehydrating apparatus is provided, while at the same time means for continuously introducing the moistened grain and removing the dried grain without breaking the vacuum is also provided. According to the present embodiment, this idea is carried into effect by connecting the hopper 3 with the cap 12 through a contracted neck 14, embodying a curved enlargement or valve housing 15. Within this housing 15 rotates a valve or spider comprising a plurality of rotary arms 16 on the spindle 17, said blades 16 being adapted to form therebetween a plurality of grain receiving troughs or pockets.

The hopper bottom 13 of the dehydrating apparatus is similarly provided with a depending neck 18, with a valve housing 19, and a rotary valve, comprising the blades 20 carried by a spindle 21. An inspection of Fig. 2 will show that the discharge valve is of larger capacity than the inlet valve. By this means, the accumulation of grain in the vacuum chamber, is positively prevented, the required length of exposure to the vacuum being preferably secured by having enough screens 26 and 27 for sufficiently extending the dehydrating action.

Each of the spindles 17 and 21 has keyed thereto, without their housings, a pulley 22, said pulleys being connected by an endless belt 23. The upper spindle 17 is also provided with a pulley 24 keyed thereto, which receives its power from a belt 25, the rotary valves being thereby caused to rotate continuously at a constant ratio which, by reason of the larger capacity of the discharge valve, prevents any accumulation within the dehydrating tank.

Referring more especially to Fig. 2, means for separating the massed grain and distributing it so as to make each individual berry freely accessible to the dehydrating effect of the vacuum, a plurality of inclined screens which, discharge successively from one to the other, are arranged within the tank 11. In the present embodiment, these screens comprise a plurality of upright cones 26, and a plurality of inverted frusto-conical screens 27, the bases of said inverted screens being of greater diameter than the upright screens, and being secured around their peripheries to the cylindrical screen 28 which retains the grain within certain limits during its passage through the uprights. By this means, grain which is discharged in a mass onto the apex of the top cone 26 is scattered and rolls down into the top inverted screen 27, from which it is in turn discharged through a central aperture (see Fig. 1) onto the apex of the next cone 26. During its passage, therefore, the grain is finely divided and thoroughly exposed to the vacuum, being discharged through the lowermost inverted screen 27 into the compartment of the discharge valve arranged below.

In order to provide means for applying a dry heat to the grain *in vacuo* as well as to expand the vapor to facilitate maintaining the vacuum, a steam pipe 29 extends through the outer casing 11 and forms a coil 30 within the annular space between the screen 28 and the outer wall 11. The chamber is exhausted through a pipe 31 by any suitable means such as the pump 32, said pipe being connected to the hopper bottom 13 and controlled by a valve 33.

The operations of my improved apparatus will now be readily understood. If the grain is in such condition that it is undesirable to add moisture, it can be introduced into the general hopper 3 through the tanks 1, the supply pipe for said tanks being provided with a valve 40 for closing off the steam. An outer steam coil 35 beneath a screen guard 36 and an inner steam coil 37 provided with a screen guard 38 discharging through a central opening 39, makes it possible to effect a preliminary dry heating of the grain in the hopper 3. The moisture is therefore in a condition to be more readily disposed of in the vacuum tank. In every stage of the process, the temperature should be kept preferably below 145 degrees Fahrenheit and under no conditions should it rise higher than 165 degrees Fahrenheit. In the steam treatment of grain, the tanks 1 are filled successively after they have been discharged into the hopper 3, the steam being turned into said tanks 1 to soak or moisten the grain. This action may be maintained for some hours depending upon the sizes of the tanks and quantity of grain treated, when it is dumped into the hopper 3, being maintained at a raised temperature of preferably about 145 degrees Fahrenheit until it is discharged into the vacuum tank. The berries having become soaked and swelled by the steam, are in their heated moistened condition, more sensitive to the action of the vacuum, the strong internal pressure created in the individual berries serving to bring out the moisture and pigment oils the exterior shells of the grain being made more permeable under the steaming action. In this manner, not only is the moisture driven off, but also the pigment containing oils. The grain berries are thus subjected to a rapid but effective bleaching action, and are at the same time thoroughly dried in such a way that should they be shipped long distances in closely confined spaces, such as in the holds of ships and the like, the grain will be proof against that disastrous sweating action which frequently molds and rots the goods to such an extent as to render it unavailable for use.

One of the most valuable uses to which the herein described apparatus is adapted is the treatment of wheat, which, in some sections of the country, is received at the thresher with an ever increasing proportion of onions which become crushed between the corrugated milling rolls, resulting in clogging the same and causing a very inefficient action. When such wheat is treated in the apparatus described herein, the moisture from these onions is entirely extracted, along with odoriferous oils contained therein. Wheat, which is adulterated with onions, can, after this dehydrating action, be passed through any suitable apparatus for breaking up and removing the dried onions; and even if portions of such onions remain in suspension, they will be so thoroughly deodorized as to be unnoticeable in the finished product. A further advantage is that certain incipient changes are prevented in the grains treated by this process, which, if they are not interrupted, finally result in the discoloration of the meal or flour produced therefrom.

What I claim is:

1. In an apparatus of the character described, the combination with a tank, of means for exhausting the air within said tank, a plurality of inclined screens discharging from one to the other, an inlet valve discharging onto the uppermost screen; said inlet valve being adapted to maintain an air-tight closure in said tank, a discharge valve receiving grain from said screens, said discharge valve being adapted to maintain an air-tight closure, and means for continuously operating said valves.

2. In an apparatus of the character described, the combination with a tank, of a screen within said tank and spaced from the outer wall thereof, a steam coil extending around said screen between it and the outer wall of said tank, a plurality of inclined screens centrally disposed within the first said screen, a continuously movable valve disposed above the uppermost screen; said inlet valve being adapted to continuously maintain an air-tight closure during its movement; a continuously movable air-tight outlet valve, and means for creating a vacuum within said tank.

3. In apparatus of the character described, a vacuum chamber, provided with inlet and outlet valves, a partition arranged within said vacuum chamber and spaced from the inner wall of said chamber, and heat-radiating means disposed in the space between said partition and the wall of said vacuum chamber.

4. In an apparatus of the character described, the combination with a vacuum chamber through which grain falls by gravity, said chamber being provided with an inlet and outlet, of a plurality of reticulated chutes interposed between said inlet and outlet, said chutes being adapted to segregate the grain during its passage through said chamber.

5. In apparatus of the character described, a vacuum tank with inlet and outlet valves, a screen within said tank and spaced from the inner wall thereof, and heat radiating means disposed in the space between said screen and the inner wall of said tank.

6. In an apparatus of the character described, a vacuum tank with inlet and outlet valves, a screen within said tank and spaced from the outer wall thereof, heat-radiating means disposed in the space between said screen and the outer wall of said tank, and means within said screen for separating the grain as it falls through said vacuum tank.

7. In an apparatus of the character described, a vacuum tank, with inlet and outlet valves, a screen within said tank and spaced from the outer wall thereof, heat radiating means disposed in the space between said screen and the outer wall of said tank, means within said screen for separating the grain as it falls through said vacuum tank, said means comprising a plurality of inclined screens discharging one onto another.

8. In an apparatus of the character described, a vacuum tank, with inlet and outlet valves, a screen within said tank and spaced from the outer wall thereof, heat radiating means disposed in the space between said screen and the outer wall of said tank, means within said screen for separating the grain as it falls through said vacuum tank, said means comprising a plurality of inclined screens discharging one onto another, and means for exhausting said tank and opening into said space between the screen and the outer wall of said tank.

9. In apparatus of the character described, a vacuum chamber arranged on a vertical axis and provided with inlet and outlet valves at top and bottom respectively, and an imperforate pipe arranged around the inner wall of said chamber, said pipe being adapted to convey the heat-emitting fluid.

10. In apparatus of the character described, a vacuum chamber, a screen spaced from the inner wall thereof, a heat-radiating pipe arranged in a coil within the space between said screen and the inner wall of said chamber, and a vacuum pump connected up with said space and adapted to exhaust the vapors expelled from material passing through said vacuum chamber within said screen.

11. In apparatus of the character described, a vacuum chamber, a screen spaced from the inner wall thereof, a heat-radiating pipe arranged in a coil within the space between said screen and the inner wall of said chamber, and inclined screens arranged within the first said screen to form an indirect passage through said vacuum chamber.

12. In an apparatus of the character described, a heat emitting pipe coiled about a vertical axis, screens within said coil and inclined successively toward and away from said pipe, and means for drawing off the moisture given off by the treated material.

ADOLPH JAEGER.

In the presence of—
G. B. WICKMAN,
M. A. HALDEMAN.

Copies of this patent may be obtained for five cents each, by addressing the "Commissioner of Patents, Washington, D. C."